Dec. 3, 1963  W. DICKINSON  3,113,279
NOISE SUPPRESSED DELAY LINE HAVING FLUID-GAS VIBRATION
ABSORBING TERMINATIONS AT ENDS OF LINE
Filed June 16, 1961
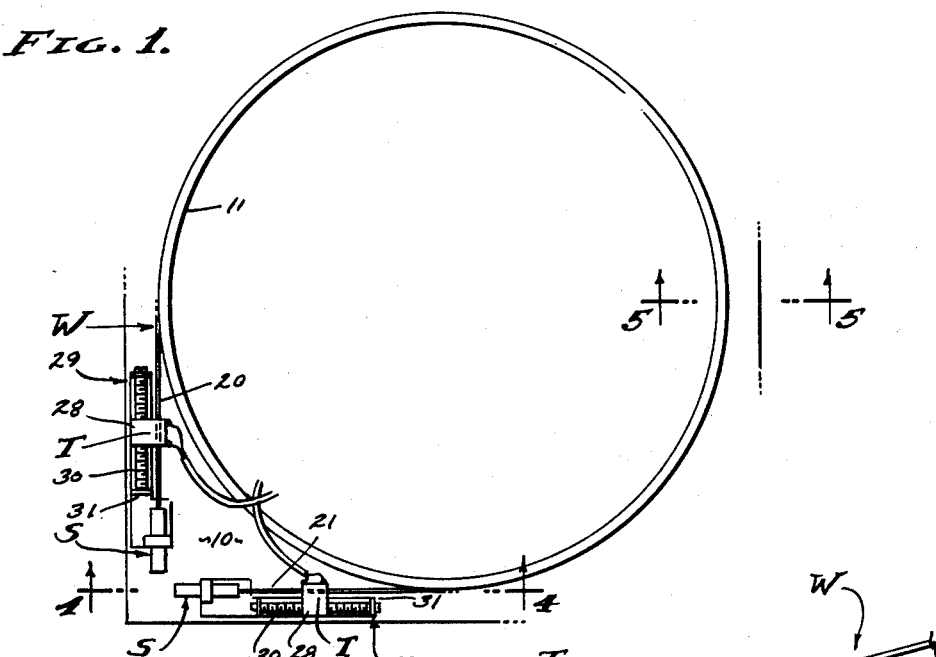
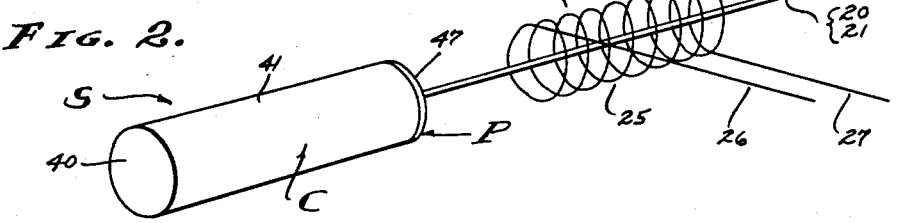
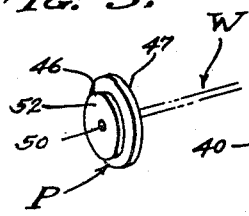
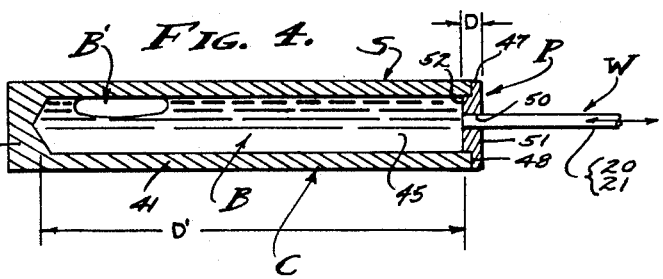
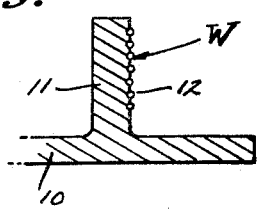
INVENTOR.
WILLIAM DICKINSON
BY
W. H. Maxwell
AGENT

United States Patent Office 3,113,279
Patented Dec. 3, 1963

3,113,279
NOISE SUPPRESSED DELAY LINE HAVING FLUID-GAS VIBRATION ABSORBING TERMINATIONS AT ENDS OF LINE
William Dickinson, Los Angeles, Calif., assignor to McCullough and Associates, Culver City, Calif., a partnership
Filed June 16, 1961, Ser. No. 117,654
4 Claims. (Cl. 333—30)

This invention relates to a noise suppressed delay line and is particularly concerned with elimination of extraneous reverberations that are ordinarily reflected in electronic devices of the type under consideration and which often defeat the purpose for which said devices are designed to operate.

Delay lines are employed in electronic circuits, for example, in order to preserve a memory for a given length of time. The delay line is characterized by a length of material, usually a round wire, that receives an electro-mechanical impulse at one end thereof, and that transmits said impulse physically to the other end thereof where an electromechanical device percevies said impulse. The time elapsed in travel of the impulse from one end of the wire to the other is referred to as the delay time, which is in most cases a very short length of time for instance, one millionth of a second. Generally speaking, the electromechanical units at each end of the impulse transmitting wire are referred to as transducers, which convert infinitesimal motions of the wire into minute electrical impulses which are then amplified for utility.

In delay lines of the character under consideration, two general kinds of mechanical forces can be imposed thereon and transmitted therethrough as impulses. That is, circumferential or longitudinal forces can be imposed upon the length of wire. Knowing that longitudinal forces are efficiently reflected from the ends of the wire (usually considered an adverse condition), the first mentioned circumferential forces are commonly imposed upon the wire thereby avoiding said longitudinal reflection phenomenon. However, the efficiency of impulse transmission is poor in devices resorting to circumferential imposition of forces, and problems arise at the electromechanical transducers in accuracy of transcription. On the contrary, however, I have discovered means whereby the most efficient longitudinal imposition of forces can be feasibly utilized in delay lines with the elimination of reflections that ordinarily render such an imposition of forces impractical.

A general object of this invention is to suppress reflection of impulses in a delay line wherein transducers, or the like, are employed at opposite ends of the line to transcribe impulses therethrough. More particularly, it is an object to suppress longitudinal reflection of impulses impoled axially in a delay line.

An object of this invention is to prevent longitudinal reflection of impulses from occurring, to an objectionable degree, whereby the usable impulses imposed longitudinally upon the wire are clearly readable without disturbance from extraneous accumulation of reflected impulses.

Another object of this invention is to provide frequency absorbing means at the end, or opposite ends, of the wire whereby impulse forces are not reflected objectionably. That is, to an extremely high degree, impulses are damped out and are not reflected. In practice, the said frequency absorbing means is a structure that is matched or tuned to the operational frequency of the device, and which comprises low modulus characteristics for absorbing energy in order to prevent accumulation of and amplification of longitudinal forces or impulses.

The various objects and features of this invention will be fully understood from the following detailed description of the typical preferred form and application thereof, throughout which description reference is made to the accompanying drawings, in which:

FIG. 1 is a plan view of a typical delay line construction embodying the features of the present invention.
FIG. 2 is a perspective view showing the elements of the present invention diagrammatically.
FIG. 3 is a perspective view showing one of the elements involved.
FIG. 4 is an enlarged sectional view taken as indicated by line 4—4 on FIG. 2.
FIG. 5 is an enlarged detailed sectional view taken as indicated by line 5—5 on FIG. 1.

In the drawings I have shown a typical embodiment of the present invention and which involves, generally, a base 10 with a core 11 for support of the delay line wire W, a pair of transducers T and one at each end portion of the wire W, and a pair of impulse suppressors S and one at each end of the wire W. It is to be understood that there may be but one suppressor S at one end of the delay line wire W; however, in its most practical form the invention involves a suppressor S at each reflective end of the wire W. Further, the said suppressors S act as anchors for the opposite ends of the wire W, whereby said wire is carried and secured to the core 11.

The base 10 can vary widely and but a portion thereof is indicated in the drawing. For example, the base 10 may be a part of a housing designed to enclose the structure herein disclosed and the base 10 mounts the various elements thereof (see FIG. 1). As shown, the base 10 is a flat plate-like part with a central and upstanding core 11 that is cylindrical in form. The elongate wire W is wrapped onto the core 11 to have convolutions, preferably spaced from each other by suitable guide grooves 12 in the periphery of the core.

The wire W is, for example, a round wire of exacting diameter and with uniform surface smoothness. The length of the wire W will vary upon the time delay desired and will be simply referred to as being of substantial length. As shown in FIG. 1, the opposite end portions 20 and 21 of the wire W extend tangentially from the periphery of the core 11, and each of said portions is straight and extended freely between the core 11 and the respective terminal ends of the wire.

The transducers T can vary widely as circumstances require, it being necessary that they transmit and receive longitudinal forces through the wire W and convert them into electrical signals. In FIG. 2 of the drawings I have shown a preferred arrangement wherein the transducer T, both transducers being alike, is characterized by a winding 25 engaged around the end portion 21 (or 220) of the wire W. Infinitesimal longitudinal movements of the wire structure are detected by electrical phenomenon and transmitted through electrical conductors 26 and 27 to an amplifier (not shown). The winding 25 is supported by an insulating body 28 shiftable longitudinally of the wire W on a positioning means 29. Said means 29 is in the form of a feed screw 30 journalled at its opposite ends on mounting lugs 31 that frictionally engage the screw, as by resilient spring pressure against shoulders at opposite ends of the screw 30. The screw 30 is slotted so as to be rotated by a tool and it is threadedly engaged in the body 28. It will be apparent that the transducer T can be selectively positioned longitudinally of said end portions 20 and 21, in order to vary the effective length of the delay line wire W.

In accordance with the invention I provide the suppressors S, preferably one at each end of the wire W. The delay line device under consideration must necessarily be designed to operate at or within a certain frequency of one million cycles per second. Therefore, the present invention contemplates the suppression of impulses at this designed frequency and to this end provides the suppressors S each of which involves, generally, a case C, a plate P, and a body B of fluid. The elements are related to each other on a common axis that is coincidental with and which extends along the extended longitudinal axis of the wire W. The case C is closed by the plate P and contains the fluid body B, the wire W being operatively connected to the suppressor S through engagement with the plate P.

The case C is elongated along the extended axis of the wire W and is preferably a hollow cylinder, open at the end to be connected with the wire W and closed by a wall 40 at its opposite or bottom end. The exterior wall 41 and bottom wall 40 are substantially heavy and immovable, the case C being mounted to the base 10 by suitable brackets, as shown.

The plate P characterizes the present invention and serves a plurality of functions, i.e., to close the case C establishing a chamber 45 therein, to anchor the end portion 20 (or 21) of the wire W, and to receive impulses axially and longitudinally from the end of said wire. As a closure, the plate P is cap-shaped with its outer diameter 46 entered into the inner diameter of the cylindrical case C, and with a peripheral flange 47 stopping against the foremost end face 48 of the case C. The plate P can be pressed into position and/or brazed to the case C. As an anchor for the wire W the plate P has a central bore 50 therethrough to receive the terminal end portion of the wire W. The said wire is passed into the bore 50 with a pressed fit or secured by brazing or the like, all as circumstances may require. In any case, the wire W is anchored to the plate P and to the case C directly, as described.

In carrying out the present invention the plate P is a vibrating element, preferably disc-shaped, and it is designed to oscillate at a certain frequency, the example given being one million cycles per second, designated for operation of the particular delay line involved. The shape of the plate P can be varied, and in its simple form it is a solid plate with front and back faces 51 and 52 that are parallel, and so that axial impulses at the wire W cause the plate to flex and to oscillate with a diaphragm movement or action. The distance D between the faces 51 and 52 is the designed factor to be considered and said dimension is determinable when considering the material of which the plate is formed, the diameter thereof and the frequency at which it is to vibrate axially at the center thereof.

The fluid body B is provided to damp the oscillatory motion of the plate P and to retard and/or prevent resonance therein that would otherwise accumulate from the motion of the wire W. The body B is of low modulus elasticity and for example can be a body of plastic material, as a body of rubber. In the preferred form the body B is a fluid body of viscous oil entrapped in the chamber 45, substantially occupying said chamber. The chamber 45 establishes a horizontally disposed column of liquid of length D' tuned to vibrate at a frequency other than said one million cycles per second, given for example. In practice, the length D' is determined by elongating the chamber 45 to an unlike wave length. As shown, the case C is horizontally disposed so that the fluid engages oppositely the plate P and bottom wall 40. This disposition of the case can be important when a bubble of compressible gas B' is contained within the chamber. (See FIG. 4.) In theory, the compressible gas B' allows for movement of the fluid oil B which inertially retards movement of the plate P.

From the foregoing, it will be seen that a very simple and straightforward suppressor construction is provided which can be readily designed to absorb frequencies at a certain value. By receiving said frequencies from the terminal ends of the wire W they are readily impressed into the fluid body B to be absorbed and damped by the compressible gas body B', whereby the signal imposed upon the line for utilitarian purposes is unencumbered by extraneous reverberations.

Having described only a typical preferred form and application of my invention, I do not wish to be limited or restricted to the specific details herein set forth, but wish to reserve to myself any modifications or variations that may appear to those skilled in the art and fall within the scope of the following claims.

Having described my invention, I claim:

1. In an electromechanical device comprising an elongate impulse conducting element and means at one end thereof to impose impulses into said element, a suppressor for eliminating extraneous reflection of impulses and including, an element to oscillate at the operational frequency of the first mentioned element, a liquid body contained in a case and engaging said second mentioned element, and a gas body contained in said case to be compressed and depressed by movement of said liquid.

2. In an electromechanical device comprising an elongate impulse conducting element with means at one end thereof to impose impulses into said element and with means at the other end thereof to receive impulses from said element, suppressors at opposite ends of said element and each including, an element to oscillate at the operational frequency of the first mentioned element, and a fluid body contained in a case and engaging said second mentioned element.

3. In an electromechanical device comprising an elongate impulse conducting element with means at one end thereof to impose impulses into said element and with means at the other end thereof to receive impulses from said element, suppressors at opposite ends of said element and each including, an element to oscillate at the operational frequency of the first mentioned element, a liquid body contained in a case and engaging said second mentioned element, and a gas body contained in said case to be compressed and depressed by movement of said liquid.

4. In an electromechanical device comprising an elongate impulse conducting element with means at one end thereof to impose longitudinal impulses into said element and with means at the other end thereof to receive longitudinal impulses from said element, suppressors at opposite ends of said element and each including, an element to oscillate at the operational frequency of the first mentioned element, a liquid body contained in a case and engaging said second mentioned element, and a gas body contained in said case to be compressed and depressed by movement of said liquid.

References Cited in the file of this patent

UNITED STATES PATENTS

| | | |
|---|---|---|
| 1,678,116 | Harrison | July 24, 1928 |
| 1,719,484 | Norton | July 2, 1929 |
| 1,852,795 | Wegel | Apr. 5, 1932 |
| 1,906,985 | Marrison | May 2, 1933 |